United States Patent
Owen et al.

(10) Patent No.: US 7,031,265 B2
(45) Date of Patent: Apr. 18, 2006

(54) METHOD AND APPARATUS FOR PERFORMING PACKET DETECTION PROCESSING

(75) Inventors: Henry Spyker Owen, Medford, NJ (US); Chad Michael Hawes, Burlington, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/949,001

(22) Filed: Sep. 24, 2004

(65) Prior Publication Data
US 2005/0063386 A1   Mar. 24, 2005

Related U.S. Application Data

(60) Provisional application No. 60/505,507, filed on Sep. 24, 2003.

(51) Int. Cl.
   *H04J 1/02*   (2006.01)
   *H04L 27/14*  (2006.01)

(52) U.S. Cl. ............ 370/252; 370/497; 375/343; 375/350

(58) Field of Classification Search ........... 370/280, 370/281, 282, 343, 344–350, 338, 252, 497; 375/140, 141, 233, 343, 350
See application file for complete search history.

(56) References Cited

U.S. PATENT DOCUMENTS

| | | | | |
|---|---|---|---|---|
| 5,353,307 A | * | 10/1994 | Lester et al. | 375/233 |
| 6,430,212 B1 | * | 8/2002 | Alisobhani et al. | 375/141 |
| 6,618,452 B1 | * | 9/2003 | Huber et al. | 375/343 |
| 6,639,939 B1 | * | 10/2003 | Naden et al. | 375/140 |
| 6,661,857 B1 | * | 12/2003 | Webster et al. | 375/350 |
| 6,882,634 B1 | * | 4/2005 | Bagchi et al. | 370/338 |
| 2002/0013135 A1 | | 1/2002 | Proctor, Jr. | |
| 2002/0057713 A1 | | 5/2002 | Bagchi et al. | |
| 2003/0021365 A1 | * | 1/2003 | Min et al. | 375/343 |
| 2003/0031275 A1 | * | 2/2003 | Min et al. | 375/326 |

OTHER PUBLICATIONS

Copy of International Search Report; Form PCT/ISA/210; Mail Date Jun. 7, 2005; Second Sheet.

* cited by examiner

*Primary Examiner*—Alpus H. Hsu
(74) *Attorney, Agent, or Firm*—Lowenstein Sandler

(57) ABSTRACT

A method and apparatus for performing packet processing is described. A signal having a preamble sequence is received. A detection parameter estimate is derived from the preamble sequence. The detection parameter estimate is evaluated to process at least one packet in the signal.

18 Claims, 8 Drawing Sheets

Length: M
Subsymbol Length: N
Subsymbol Interval: Tss

METHOD AND APPARATUS FOR PERFORMING PACKET DETECTION PROCESSING

CROSS-REFERENCE TO RELATED APPLICATIONS

This application claims benefit of U.S. provisional patent application Ser. No. 60/505,507, filed Sep. 24, 2003, which is herein incorporated by reference.

GOVERNMENT RIGHTS IN THIS INVENTION

This invention was made with U.S. government support under contract number DAAB07-01-9-L504. The U.S. government has certain rights in this invention.

BACKGROUND OF THE INVENTION

Embodiments of the present invention generally relate to a method for detecting wireless communication packets that use a coded sequence, e.g., a preamble sequence to aid detection. In wireless communications, packets of information are transmitted and received. A preamble sequence is placed within the transmitted packet so that a receiver will be able to recognize the preamble sequence and perceive that a packet has been received. A typical transmitted preamble sequence may be given as $$p[k]=[p_1, p_2, p_3, \ldots, p_{k-1}, p_k]. \quad \text{(EQU. 1)}$$

There are a number of means for encoding a preamble sequence and detecting the preamble sequence at the receiver side. One is called coherent integration. The other is called non-coherent integration. In coherent integration, a filter is applied where every single tap of the filter matches every single element of the preamble sequence. This technique provides very good gain but is subject to performance degradation in the presence of Doppler shifts and dynamic multipath. An example of a matched filter may be given as $$h[k]=[p_k^*, p_{k-1}^*, \ldots, p_3^*, p_2^*, p_1^*]. \quad \text{(EQU. 2)}$$

When there exists a frequency offset in the received signal after conversion to a frequency appropriate for correlation processing, or when the channel amplitude and phase characteristics vary over the time period of the preamble, the detection filter is no longer matched so that there is a significant signal-to-noise ratio (SNR) loss. To address this SNR loss, current methods include separating the preamble sequence into segments or subsymbols, where ideal matched filtering is performed on one or more segments and the resulting real magnitudes or squares of magnitudes are added together. The use of ideal matched filtering on segments of the preamble is known as non-coherent integration. However, non-coherent integration suffers from processing loss relative to an ideal matched filter.

Therefore, there is a need in the art for a wireless communications packet detection and/or synchronization method that is resistant to degradation caused by frequency shifts and is resistant to degradation caused by limited channel coherency.

SUMMARY OF THE INVENTION

The present invention generally describes a method and apparatus for performing packet processing. In one embodiment, a signal having a preamble sequence is received. A detection parameter estimate is derived from the preamble sequence. The detection parameter estimate is evaluated to process at least one packet in the signal.

More specifically, in one embodiment, a method and apparatus is described that uses the magnitude of an estimate of the autocorrelation of adjacent subsymbols within a known detection preamble sequence to provide a packet detection parameter. In one embodiment, the phase of the estimate is used to provide improved demodulation of data within the packet.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
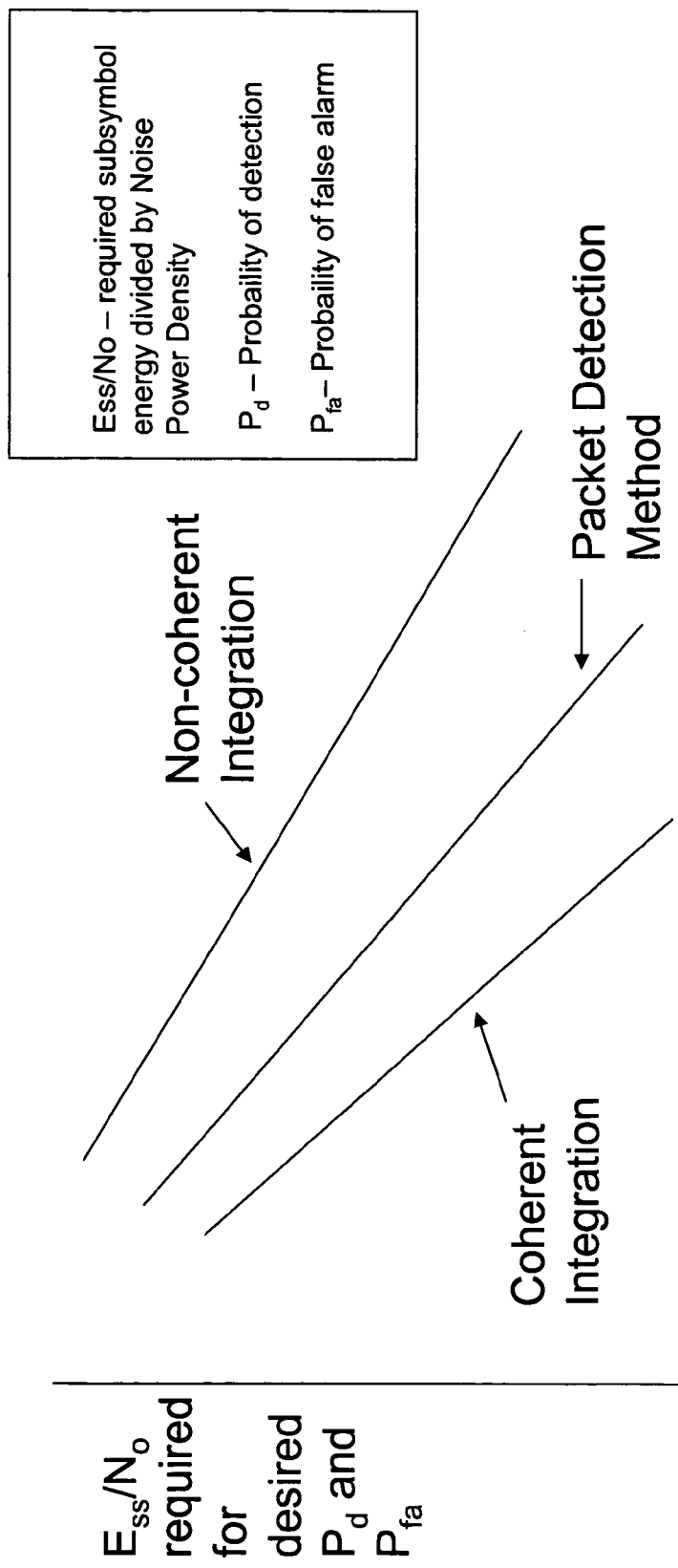
FIG. 1 illustrates a performance curve in accordance with the present invention.

FIG. 1 illustrates a performance curve in accordance with the present invention. The curve shown in FIG. 1 shows performance over the number N of elements, e.g. subsymbols, in a preamble sequence. Coherent integration techniques typically perform better than non-coherent integration techniques when longer preamble sequences are utilized. However, the higher performance of the coherent integration technique degrades quickly in the presence of Doppler shifts and dynamic multipath. Significant processing resources are required to conduct coherent integration effectively in a Doppler and dynamic multipath resistant manner. The present invention provides an autocorrelation method that offers better performance than non-coherent integration with a lower amount of processing than is needed in coherent integration.

Figure 2:
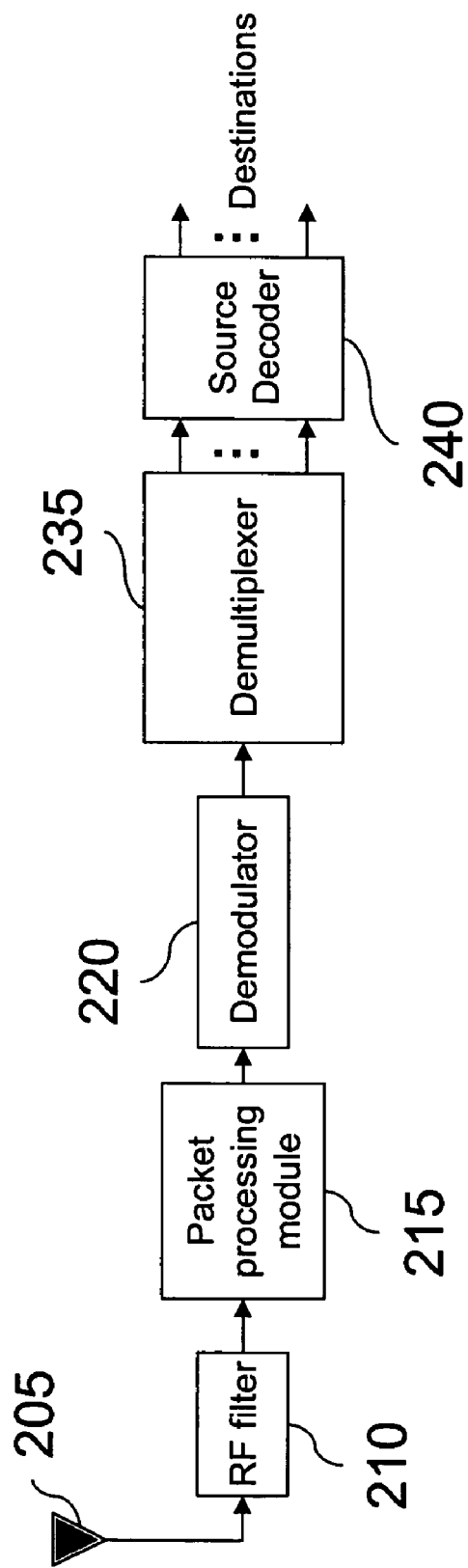
FIG. 2 illustrates a system in accordance with one embodiment of the present invention.

FIG. 2 illustrates a typical receiver system in accordance with one embodiment of the present invention. A signal is received at antenna 205. The signal received at antenna 205 may be a signal having a preamble sequence and a payload. The payload may contain at least one packet. Filtering is performed at RF filter 210. RF filter 210 may be a matched filter, e.g., a sliding correlator. Packet processing module (e.g. a packet detection module) 215 provides a detection parameter derived from the preamble of the signal, which is described in greater detail below. The signal is then demodulated using demodulator 220. It should be apparent to one having skill in the art that packet processing module 215 may also be implemented in demodulator 220. Once the signal is demodulated, the demodulated signal is routed to source decoder 240 via demultiplexer 235, where the demodulated signal is further decoded.

Figure 3:
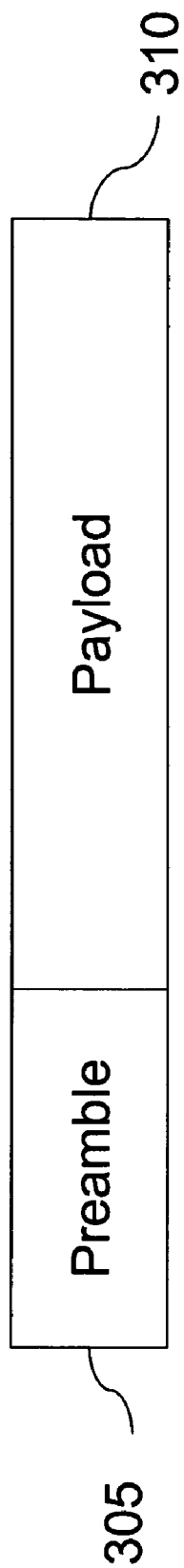
FIG. 3 illustrates an example of a received signal in accordance with one embodiment of the present invention.

FIG. 3 illustrates an example of a received signal, e.g., a random access or time division access burst. In one embodiment, the random access burst comprises a preamble sequence 305 and payload 310. Payload 310 may comprise a user packet, cyclic redundancy check (CRC), or other information. Many wireless communications systems use a training signal, often as a preamble or midamble to a packet, for the purposes of packet detection and synchronization. Such a preamble sequence comprises a sequence of known chips, symbols, or pulses that provides a reference for a detection method. An optimum detector for a preamble, in the presence of Gaussian noise, is a matched filter. The use of a matched filter to detect a preamble is regarded as coherent integration. In one embodiment, the matched filter may be a sliding correlator.

Figure 4:
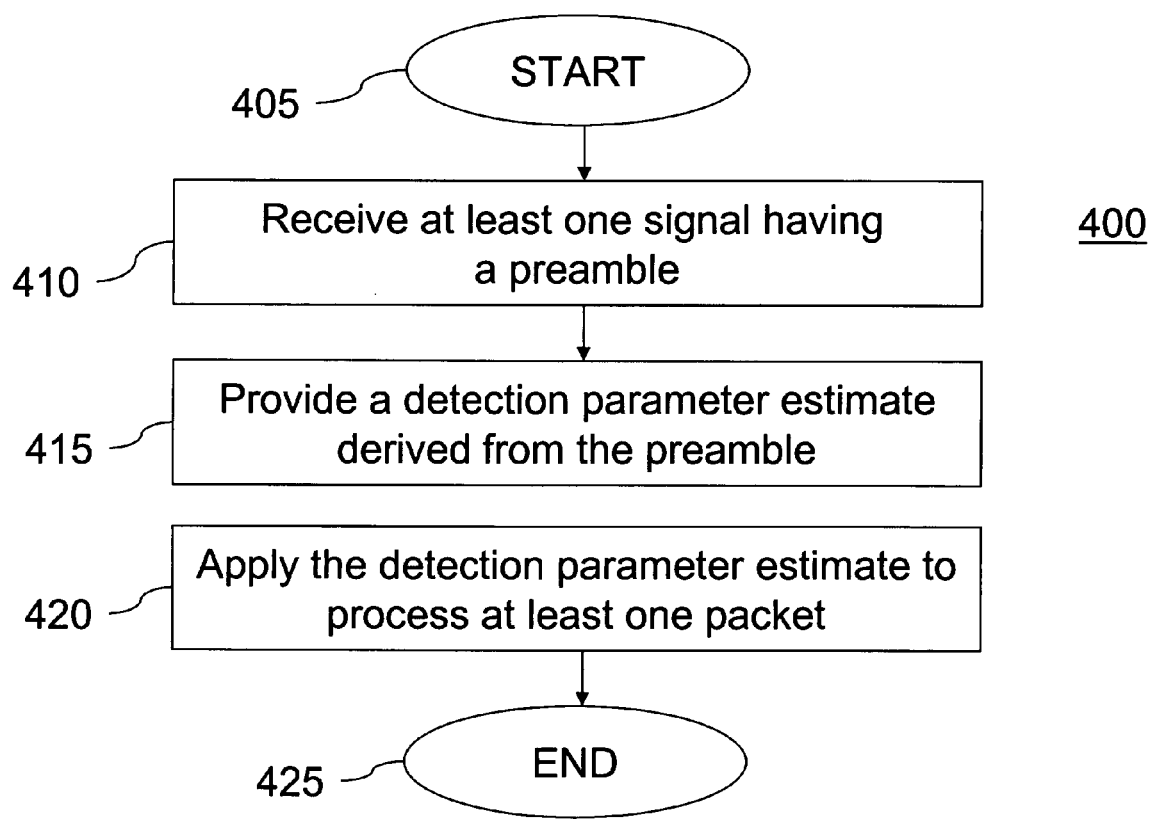
FIG. 4 illustrates a diagram of a method in accordance with one embodiment of the present invention.

FIG. 4 illustrates a diagram of a packet processing method according to one embodiment of the present invention. Method 400 starts at step 405 and proceeds to step 410. In step 410, a signal having a preamble sequence is received.

Figure 5:
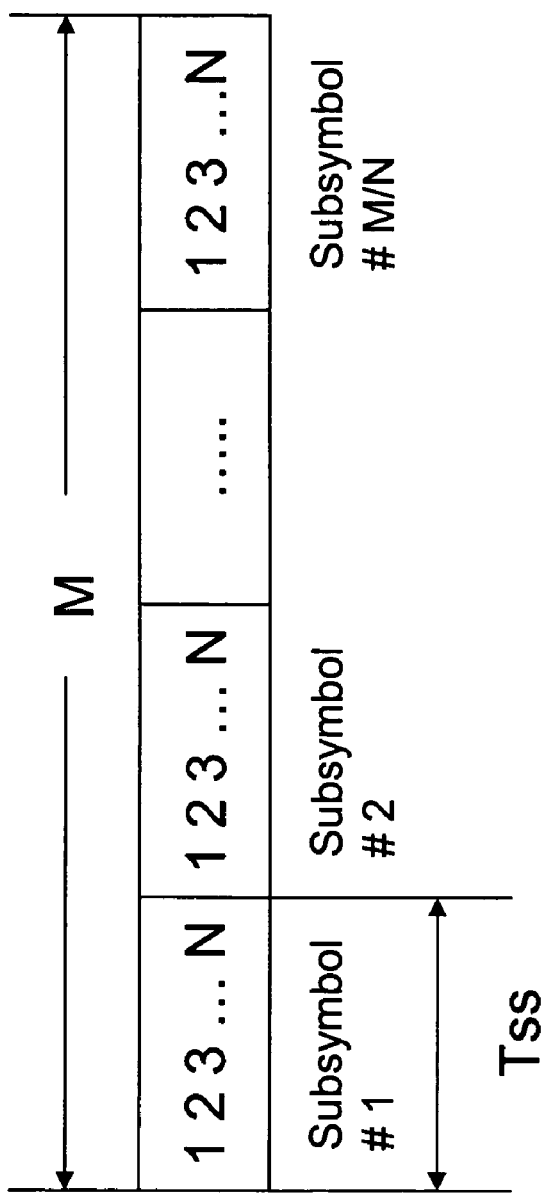
FIG. 5 illustrates a preamble sequence in accordance with one embodiment of the present invention.

One example of a preamble sequence is shown in FIG. 5. The received preamble data sequence may be given as $$x[M] = [x_1, x_2, x_3, \ldots, x_{M-1}, x_M].$$ (EQU. 3)

The received preamble data sequence of this embodiment has a length of M chips, separated into subsymbols. Each of the subsymbols has a length N. The "chips" of the received sequence can be real or complex modulated values, or separate pulses characterized by a timing offset or phase and amplitude variations.

In step 415, a detection parameter derived from the preamble is provided in two steps. First, a matched filter is applied for each of the M/N subsymbols. The output of the matched filter y(l) for the M/N subsymbols may be characterized as $$y(l) = \sum_{k=(l-1)N+1}^{lN} x[k] h_l[REM(k/N)]$$ (EQU. 4)

where x[k] represents the sequence defined in EQU. 3 and $h_l[\ ]$ represents the matched filter for each subsymbol $l$ and $l=1$ to M/N. REM in EQU. 4 means "remainder of."

Then a detection parameter is determined. In one embodiment, the detection parameter may be characterized as:

$$\hat{a} = \sum_{l=1}^{M/N-1} y[l] \times y^*[l+1]$$ (EQU. 5)

where â represents the summation from $l=1$ to M/N−1 of the product of the output of the matched filter for a subsymbol, y[$l$], with the conjugate of the output for the next subsymbol, y*[$l$+1]. The detection parameter is complex, comprising a magnitude and phase. The detection parameter is an estimate of the autocorrelation of the subsymbols, estimated at one lag, e.g., one symbol offset. The lag is set based on the width of the subsymbol.

The width of the subsymbol is set based on the type of application and the system constraints involved in each specific application. In one illustrative embodiment, M=8 and N=1024 with a chip rate of 8 MChips/sec.

Figure 6:
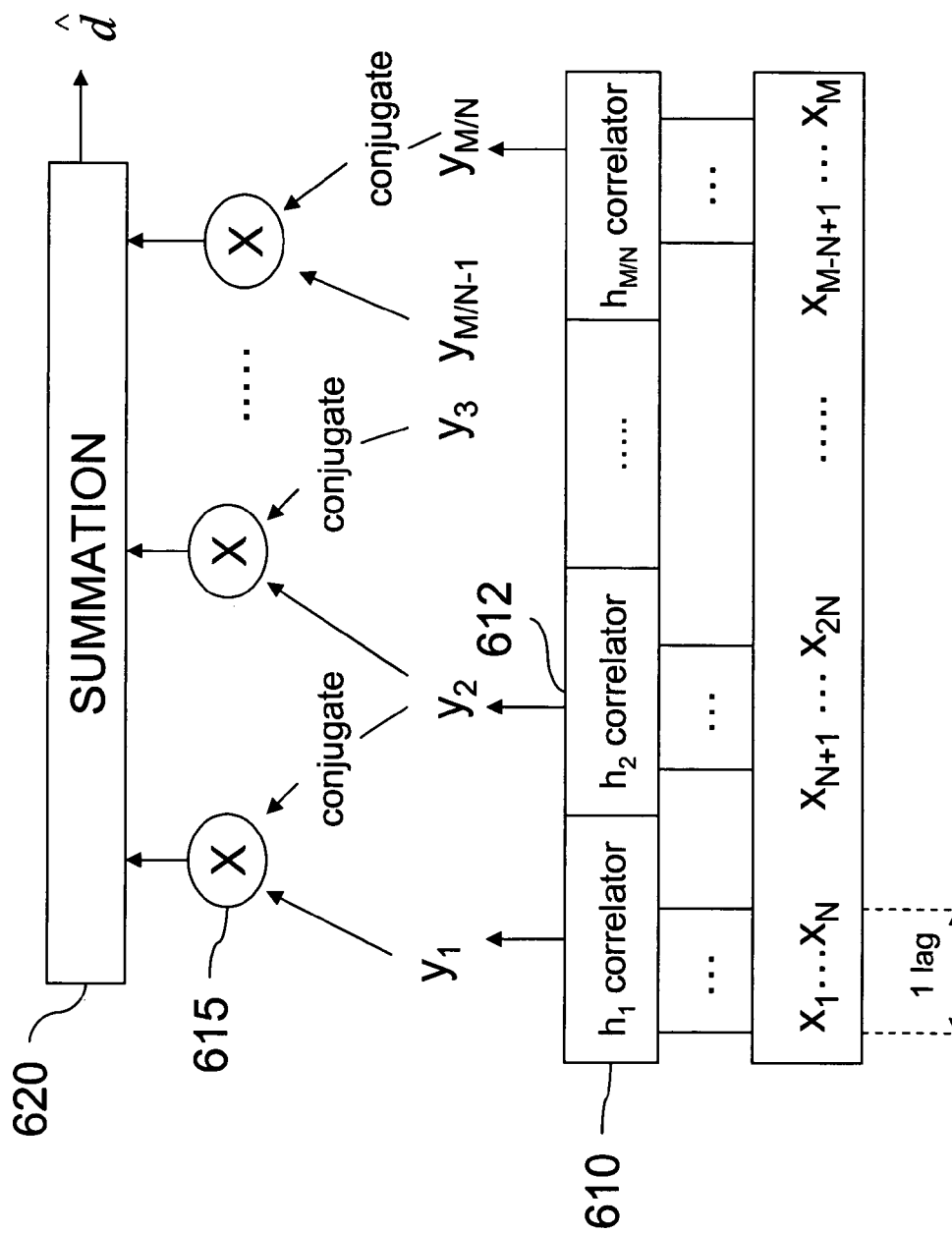
FIG. 6 illustrates an example of providing a detection parameter in accordance with one embodiment of the present invention.

FIG. 6 illustrates an example of providing a detection parameter estimate according to one embodiment of the present invention. A matched filter is applied to each subsymbol $x_1, \ldots, x_N; x_{N+1}, \ldots, x_{2N}; \ldots; x_{M-N+1}, \ldots, x_M$. The output, e.g., y1, from a matched filter 610 of a current subsymbol is then multiplied by the conjugate of the output, e.g., y2, of matched filter 612 of a subsequent subsymbol, using multiplier 615. This operation is repeated for each subsymbol. It should be noted that for each product of the output of the matched filter for a current subsymbol and the conjugate of the output of the matched filter for a subsequent subsymbol, a single estimate of the detection parameter is provided. The output from each multiplier, i.e., an estimated detection parameter, is summed by summer 620 to provide the detection parameter estimate.

Thus, the present invention applies an autocorrelation across subsymbols to determine a detection parameter. In one embodiment, the output of the autocorrelation is complex. For example, the magnitude of the output of the autocorrelation is used as a detection parameter. Various methods can use this detection parameter to determine a detection of a preamble. One method is to determine that a detection of a preamble sequence is confirmed when the magnitude of the autocorrelation function is greater than a threshold value. To detect the presence of the preamble, the magnitude of the detection parameter is compared to a previously defined threshold. Specific threshold values are selectable by application and are dependent on the desired probability of detection and probability of false alarm for packet detection.

Figure 7:
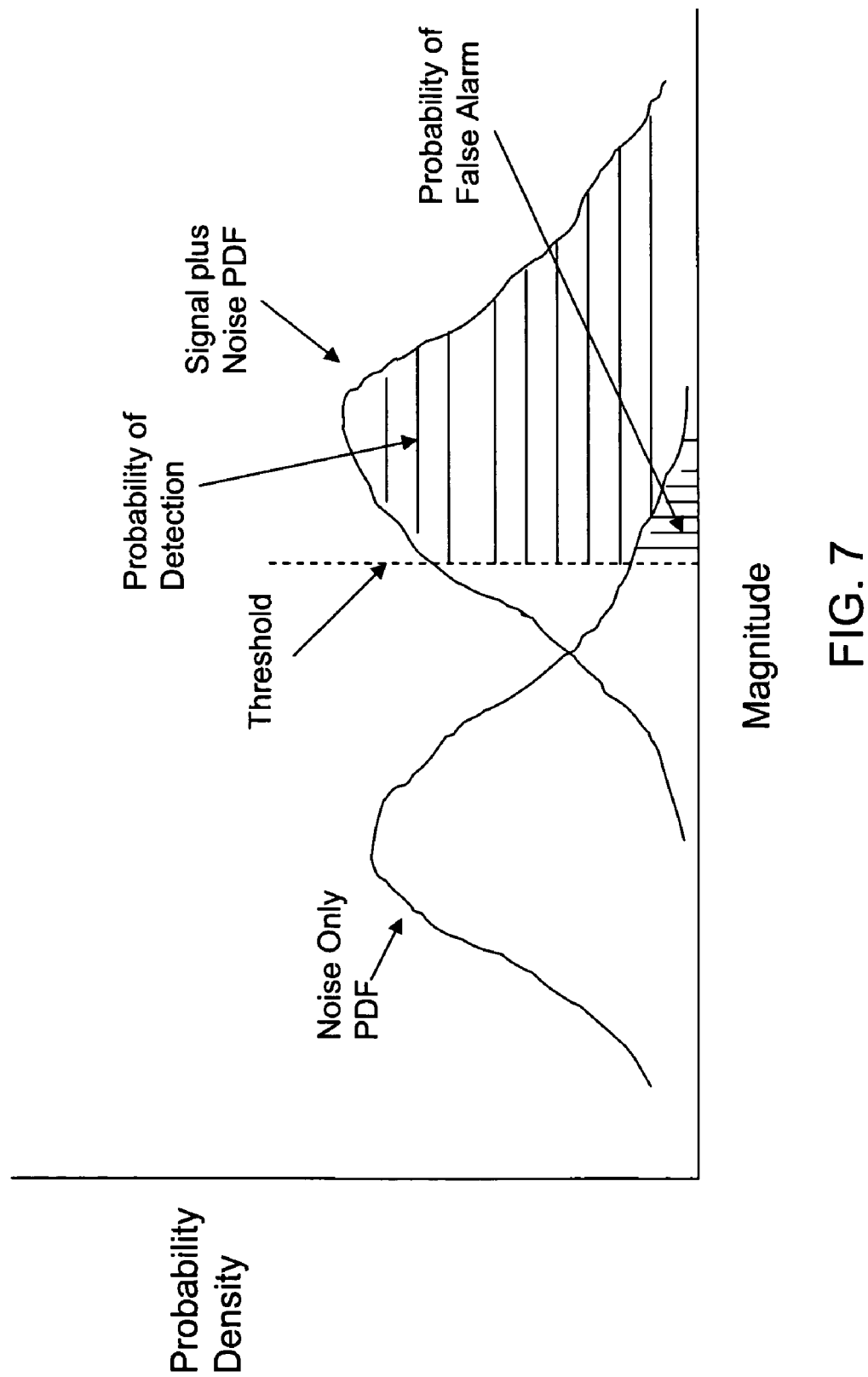
FIG. 7 illustrates a graph showing a probability of false alarm in accordance with one embodiment of the present invention.

Returning to FIG. 4, in step 420, the detection parameter estimate is evaluated to determine whether a packet is detected. In one embodiment, the threshold value may be a false alarm rate for packet detection. FIG. 7 illustrates the concept of probability of false alarm. A probability density function (PDF) is applied to the environment, which is noise, e.g., Gaussian noise. A Noise Only PDF curve is provided. A PDF is also applied when the signal is present. In this instance, a Signal plus Noise PDF curve is provided. A threshold is defined to obtain desired probability and false alarm performance for packet detection. The probability of false alarm would be defined as the area under the Noise Only PDF curve past the threshold point. The probability of detection would be defined as the area under the Signal plus Noise PDF and above the Noise Only PDF past the threshold point. The threshold is set based on the probability of false alarm and probability of detection that would be acceptable under the design constraints of the system.

Since the output of the autocorrelation, i.e., the detection parameter, is complex, magnitude and phase information is available. Embedded in the phase information is an estimate of the frequency mismatch in the channel which allows for estimation and correction of the payload. The phase of the autocorrelation estimate provides information regarding the estimated frequency offset of the received signal. The frequency offset, f, estimator may be characterized as $$\hat{f} = -\frac{1}{T_{ss}} \frac{\angle \hat{d}}{2\pi} \quad \text{(EQU. 6)}$$

where $T_{ss}$ is the symbol period and $\angle \hat{d}$ is the phase information. This frequency offset estimation can be used to correct subsequent packet data symbols before demodulation. This correction is accomplished by using corrected packet payload data, z'[k]. The corrected packet payload data may be characterized as $$z'[k] = z[k] e^{-i2\pi f T_c k} \quad \text{(EQU. 7)}$$

where the packet payload data is z[k], f is the frequency offset, $T_c$ is the length of the chip interval, and k is the current modulation chip index.

A variation of this method is to perform the calculation in EQU. 5 and EQU. 6 with non-successive subsymbols. In this case, the multiplication performed in EQU. 5 can be done with subsymbols more than one apart in index, and the frequency estimate in EQU. 6 is calculated by using a multiple of $T_{ss}$ in the denominator (where the multiple of $T_{ss}$ reflects the time delay between the subsymbols used in EQU. 5).

Data may be estimated and corrected either in the preamble itself to improve the detection of the preamble or throughout the whole payload using a running estimate of the frequency offset in the channel to correct the data and improve the signal to noise ratio of the received signal.

Other methods to correct the preamble data may be used. In one embodiment, the phase estimate, e.g., the phase information from an estimated detection parameter, is provided in real-time and is used to correct the preamble data phase prior to conducting or confirming a detection.

In one embodiment, the present invention uses processing gain improvements, relative to non-coherent integration, to support further simplification and reduced processing complexity. Since performance can be improved with less processing overhead, the power of the receiver can be reduced. The received data sequence x[n] described previously, is typically represented by a signed integer value after A/D conversion. Instead, this value can be reduced in resolution to sign only (positive or negative) so that the value x[n] has fewer bits of resolution. This allows for reduced processing for providing the detection parameter, to achieve similar results as full bit resolution in a standard non-coherent integration implementation. The resulting performance degradation, due to using fewer bits of resolution, is allowable due to the relative processing gain provided by the coherent integration of the detection parameter relative to the non-coherent gain of the standard non-coherent integration detection parameter.

For example, if a current receiver has an 8-bit implementation, each word processed by the receiver is 8-bits wide. Using the present invention a performance improvement versus non-coherent integration is provided. Because of this performance improvement, a 2-bit word could be used by the receiver instead of an 8 bit word. In this example, more computations could be done in the same space of an 8-bit word. By reducing the amount of bits used, performance would decrease to non-coherent integration as if non-coherent integration is being performed at 8 bits, however, the present invention would only be using 2-bits.

The present invention is resistant not only to frequency offsets in a received packet, but also to channel coherence limits. As long as the channel is coherent for on subsymbol interval (less than one symbol interval), the present invention is effective.

Figure 8:
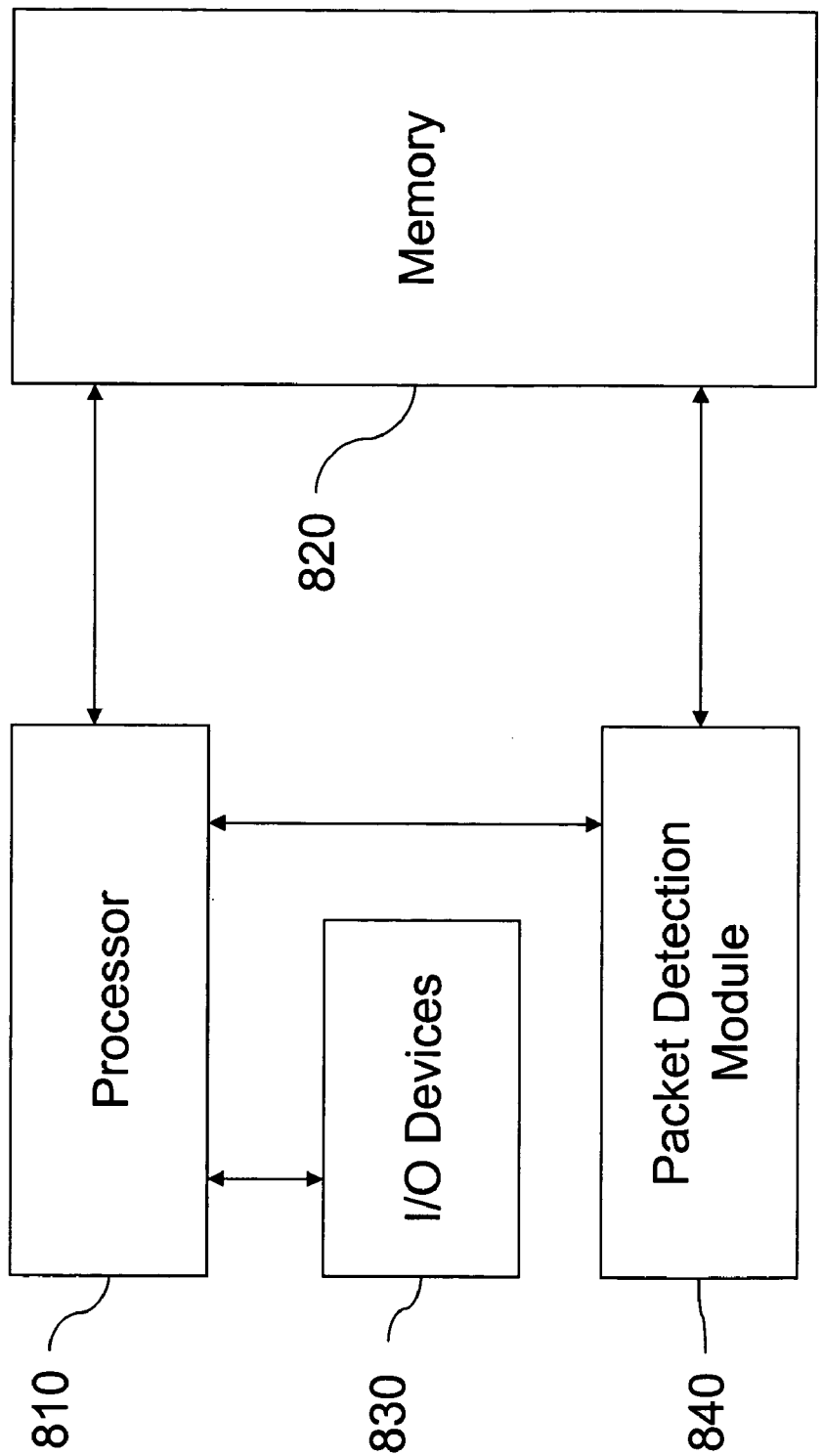
FIG. 8 illustrates a block diagram of communication signal processing device or system in accordance with one embodiment of the present invention.

FIG. 8 illustrates a block diagram of communication signal processing device or system 800 of the present invention. Specifically, the system can be employed to provide a detection parameter derived from the preamble of a signal. In one embodiment, the communication signal processing device or system 800 is implemented using a general purpose computer or any other hardware equivalents.

Thus, communication signal processing device or system 800 comprises a processor (CPU) 810, a memory 820, e.g., random access memory (RAM) and/or read only memory (ROM), packet detection module 840, and various input/output devices 830, (e.g., storage devices, including but not limited to, a tape drive, a floppy drive, a hard disk drive or a compact disk drive, a receiver, a transmitter, a speaker, A/D and D/A converters.

It should be understood that the packet detection module 840 can be implemented as one or more physical devices that are coupled to the CPU 810 through a communication channel. Alternatively, the packet detection module 840 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 820 of the computer. As such, the packet detection module 840 (including associated data structures) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method of performing packet processing, comprising:
   receiving a signal having a preamble sequence comprising a plurality of subsymbols;
   deriving a detection parameter estimate from a magnitude of an estimate of the autocorrelation of adjacent subsymbols within the preamble sequence; and
   evaluating the detection parameter estimate to process at least one packet in said signal.

2. The method of claim 1, wherein said evaluating comprises using the detection parameter estimate to detect a presence of said at least one packet.

3. The method of claim 2, wherein said presence of said at least one packet is detected in accordance with a threshold.

4. The method of claim 3, wherein the threshold is set in accordance with a probability of false alarm.

5. The method of claim 1, wherein deriving the detection parameter estimate comprises:
   applying a matched filter to each of said plurality of subsymbols;
   determining a plurality of estimated detection parameters; and
   summing the plurality of estimated detection parameters to derive said detection parameter estimate.

6. The method of claim 5, wherein a phase of each of the plurality of estimated detection parameters is used to determine a running estimate of a frequency offset.

7. The method of claim 5, wherein a phase of each of the plurality of estimated detection parameters is used to correct a phase of the preamble sequence.

8. The method of claim 1, wherein said applying comprises using the detection parameter estimate to determine a frequency offset.

9. The method of claim 1, wherein the signal comprises a reduced resolution signal.

10. A computer-readable medium having stored thereon a plurality of instructions, the plurality of instructions including instructions which, when executed by a processor, cause the processor to perform the steps of a method of performing packet processing, comprising:
   receiving a signal having a preamble sequence comprising a plurality of subsymbols;
   deriving a detection parameter estimate from a magnitude of an estimate of the autocorrelation of adjacent subsymbols within the preamble sequence; and
   evaluating the detection parameter estimate to process at least one packet in said signal.

11. An apparatus for performing packet processing, comprising:
   means for receiving a signal having a preamble sequence comprising a plurality of subsymbols;
   means for deriving a detection parameter estimate from a magnitude of an estimate of the autocorrelation of adjacent subsymbols within the preamble sequence; and
   means for evaluating the detection parameter estimate to process at least one packet in said signal.

12. The apparatus of claim 11, wherein said evaluating means uses the detection parameter estimate to detect a presence of said at least one packet.

13. The apparatus of claim 12, wherein said presence of said at least one packet is detected in accordance with a threshold.

14. The apparatus of claim 11, wherein the means for deriving the detection parameter estimate comprises:
   means for applying a matched filter to each of said plurality of subsymbols;
   means for determining a plurality of estimated detection parameters; and
   means for summing the plurality of estimated detection parameters to derive said detection parameter estimate.

15. The apparatus of claim 14, wherein a phase of each of the plurality of estimated detection parameters is used to determine a running estimate of a frequency offset.

16. The apparatus of claim 14, wherein a phase of each of the plurality of estimated detection parameters is used to correct a phase of the preamble sequence.

17. The apparatus of claim 11, wherein said applying means uses the detection parameter estimate to determine a frequency offset.

18. The apparatus of claim 11, wherein the signal comprises a reduced resolution signal.

* * * * *